Patented June 21, 1949

2,474,170

UNITED STATES PATENT OFFICE 2,474,170

SEPARATION OF ACETONE AND BUTYL ALCOHOL FROM FERMENTED MASH BY ACTIVATED CHARCOAL

Max Sulzbacher, London, England, assignor to Butacet Limited, London, England

No Drawing. Application July 26, 1944, Serial No. 546,742. In Great Britain July 27, 1943

6 Claims. (Cl. 260—593)

This invention relates to the production and separation of fermentation products and more especially but not exclusively to the separation of the fermentation products from the fermented mash in the fermentative production of acetone and butyl alcohol by neutral solvent producing organisms.

The usual industrial processes of fermentation of carbohydrate mashes by means of Clostridium acetobutylicum (Weizmann), Clostridium butylobutyricum, Clostridium saccharo aceto-butylicum, or other butyl-alcohol producing organisms yield the fermentation products in a very dilute aqueous solution since the activity of such organism is very sensitive to the concentration of their metabolism products. Thus whilst for instance the standard yield of a fermentation by means of Clostridium aceto-butylicum is about 33.7% of neutral solvents, calculated as percentage of total starch present in the mash and consists of about 20.7% butanol, 10.5% acetone, and 2.5% ethanol, a common industrial fermentation of a mash, containing 8% starch, forms an aqueous solution of only about 2.5% neutral solvents in the fermented mash or liquor.

The recovery of the fermentation products, usually carried out by distilling the volatile neutral solvents from the fermented mash requires the expensive heating of large quantities of dilute aqueous solutions in fractional distillation apparatus in order to concentrate and finally to separate the fermentation products from the liquor.

Other easily volatile products of fermentation are also usually isolated in the indicated manner for example, ethyl alcohol in the fermentation with yeast.

Another group of fermentation products is characterised by very low volatility. Representatives of this group are butylene-glycol and glycerol. The isolation of the fermentation products from the equally dilute mashes has heretofore been technically carried out by distilling off the water at ordinary pressure or in vacuo and extracting the residue with a suitable solvent, as which for example in the case of butylene-glycol, ethyl ether is chosen. It is obvious that this method is cumbersome. As a matter of fact, neither the glycerol fermentation nor the fermentative production of butylene-glycol have attained any technical importance because of the difficulties in isolation.

The main object of the present invention is to provide an improved process for the separation of fermentation products, for example, and particularly those referred to above.

It has now been discovered that the isolation of the fermentation products from the liquors is possible by technical means other than distillation, namely by adsorption.

It has been known for a considerable time that the purification of the gases hydrogen and carbon dioxide formed during an acetone-butanol producing fermentation and containing about 10 g. of vapors of neutral solvents per C. B. M. can be very suitably carried out by means of activated charcoal or active carbon. The gases, cooled down to about room temperature, are passed through horizontal cylinders filled with active carbon which adsorbs the neutral solvent content of the gases nearly quantitatively and enables the recovery of large amounts of these neutral solvents from the fermentation gases on an industrial scale. Usually three batteries of scrubbers are employed, one set being operated for actual adsorption, the second being blown with steam and the third being cooled.

It has now surprisingly been found that the separation and isolation of the fermentation products from the fermented mash can conveniently and effectively be carried out by direct treatment of the aqueous very dilute solutions of neutral solvents with suitable adsorbent agents, for example, activated charcoal.

The invention in brief includes a process comprising the separation of fermentation products (neutral to litmus) from their liquors by adsorption by means of treatment of the aqueous solutions with adsorbents, for example, activated charcoal.

The invention also includes the recovery of the adsorbed fermentation products from the adsorbent of the preceding paragraph in concentrated form and the re-activation of the adsorbent for further and continuous utilisation.

The invention in accordance with either of the preceding two paragraphs applied in the fermentative production of acetone and butyl alcohol by neutral solvent producing organisms or in any of the following processes, namely, fermentations producing butyl alcohol, ethylalcohol, glycerol, and butylene glycol.

The invention also consists in processes in and relating to the production and separation of fermentation products substantially as herein described and in products of those processes.

In order to illustrate the working principle and the effects of the new separation method a number of tests were made with an artificial solution, containing 16.6 g. butanol and 8.4 g. acetone, that is, in total 25.0 g. neutral solvents in 1000 ccs. of water. Although to simplify the analysis no ethylalcohol was present, this artificial solution approximates more or less closely to the metabolism solution obtained by a fermentation with *Clostridium acetobutylicum.*

The analytical determinations of the total neutral solvents and of acetone, titrated directly in the aqueous solution and, where possible, in the isolated solvents, followed the usual methods and gave for the solution under test: 2.48% parts by weight in parts by volume of neutral solvents, that is by weight of the dissolved substance which is not necessarily solid dissolved in a certain volume of solvent and 0.84% w./v. acetone.

A long reflux condenser in vertical position was filled with 60 g. activated charcoal, kept at $+14°$ C., and a measured amount of the solution under test was slowly dropping through the charcoal layers, the speed of throughput being adjustable. The "treated" solution was collected and analysed. Typical results are given in this table:

| Active Carbon | Input, cc. | Speed, cc./hr. | Yield, cc. | "Treated" solution | | Exp. |
|---|---|---|---|---|---|---|
| | | | | Total neutral solvents, percent w./v. | Acetone, per cent w./v. | |
| Fresh | 300 | 150 | 260 | 0.03 | 0.009 | 1 |
| Used | 400 | 100 | 390 | 1.6 | 0.53 | 1a |
| Fresh | 400 | 100 | 350 | 0.24 | 0.08 | 2 |
| Fresh | 400 | 100 | 360 | 0.21 | 0.07 | 3 |
| Fresh | 200 | 150 | 180 | | | 4 |
| Used | 100 | 100 | 90 | 0.05 | 0.016 | 4a |
| Do | 400 | 100 | 390 | 1.5 | 0.5 | 4b |

Under the conditions employed the activated charcoal (60 g.) started to lose its selective adsorption power after approximately 300 cc. of the aqueous solution under test had been passed through. No special selectivity could be observed in the use of those amounts of activated charcoal and of solution, since the ratio between acetone and butyl alcohol in the "treated" solution kept constant as long as only relatively small quantities of solution pass the adsorbent layer. If the process is continued it is found that the butyl alcohol displaces gradually and eventually completely the acetone from the adsorption layer, that is, the end solution contains acetone while the butyl alcohol remains in the charcoal. This is illustrated by the examples. It is, therefore, possible not only to isolate from a fermented mash acetone and butyl alcohol, but also to separate these two simultaneously formed solvents from each other. If, however, the procedure is continued, the selectivity of adsorption becomes apparent. One finds (see Example 2) that the quantity of butyl alcohol increases further and that the quantity of acetone adsorbed diminishes gradually and becomes even negative, that is, that elution of acetone takes place. It is therefore possible to stop the process either when the total adsorption stage is complete, or when the adsorbate consists practically only of butyl alcohol. In the first instance one has to watch the output solution for the reappearance of neutral solvents; in the latter for the reappearance of butyl alcohol. The impression of non-selectivity of the adsorption is created by the accidental—but most surprising and unexpected—fact that the ratio of adsorbability of acetone and butyl alcohol is identical with the ratio in which they are formed in the formentation process.

In order to recover the adsorbed neutral solvents from the charcoal, two methods were tested: (*a*) treatment of the chacoal (60 g.) with a relatively small amount of steam, 100 cc. of liquid condensate being obtained, and (*b*) heating of the charcoal in vacuo up to 100°, the distillate being collected in an ice-cooled receiver. Balance: 60 g. active carbon.

(*a*) Steam: (400 cc. solution).

| | Input | "Treated" solution | Recovered from charcoal | Loss |
|---|---|---|---|---|
| Total neutral solvents grams | 10.0 | 0.84 | 8.8 | 0.36 |
| Acetone concentration percent | 33.34 | 33.34 | 32.8 | |

(*b*) Heating: (300 cc. solution).

| | Input | "Treated" solution | Recovered from charcoal | Loss |
|---|---|---|---|---|
| Total neutral solvents grams | 7.5 | 0.135 | 7.2 | 0.165 |
| Acetone concentration percent | 33.34 | 33.3 | 32.95 | |

EXAMPLE 1

The following example applying the above principle illustrates how the invention may be carried into effect with certain commercial mashes, references to parts and percentages except where otherwise stated being by weight:

A 5% maize mash, that is, 50 parts maize meal containing 28.5 parts starch, in 950 parts water, was inoculated with a culture of *Clostridium aceto-butylicum* (Weizmann) and incubated at 37° C. during 60 hours. The fermented mash was cooled to room temperature and freed from the insoluble residues by filtration, no washing with fresh water being applied. Thus the solid residues of the fermented liquor remain available for use as cattle food or fertiliser. The resulting clear liquor of 780 parts by volume contained 9.36 parts neutral solvents, that is, 32.85% of the starch originally present. A very small amount of neutral solvents was probably contained in the residue. Concentration of acetone was 33.0% of total neutral solvents. Since only a 5% maize mash was fermented, the concentration of neutral solvents in the filtered liquor was lower than in the experiments above, namely only 1.2% w./v. The following results were obtained:

| Active Carbon, 60 parts | Input, parts by volume | Speed, parts by volume hr. | Yield (liquor), parts by volume | "Treated" liquor | |
|---|---|---|---|---|---|
| | | | | Total neutral solvents, per cent w./v. | Acetone concentration, per cent |
| Fresh | 400 | 100 | 380 | 0.1 | 32.9 |
| Do | 400 | 100 | 385 | 0.12 | 32.85 |
| Do | 600 | 100 | 575 | 0.25 | 32.8 |

In order to recover the adsorbed neutral solvents, to the charcoal (60 parts) 50 parts water were added and heated up to 100° C. at ordinary pressure, the distillate being collected in an ice-cooled receiver.

The above procedure gave these results:

Balance:

|  | Input | "Treated" liquor | Recovered from charcoal | Loss |
|---|---|---|---|---|
| Total neutral solvents parts | 4.8 | 0.38 | 4.2 | 0.22 |
| Acetone concentration per cent | 33.0 | 32.9 | 32.9 | |
| Total neutral solvents parts | 4.8 | 0.46 | 4.0 | 0.34 |
| Acetone concentration per cent | 33.0 | 32.85 | 32.6 | |
| Total neutral solvents parts | 7.2 | 1.44 | 5.4 | 0.36 |
| Acetone concentration per cent | 33.0 | 32.8 | 32.7 | |

EXAMPLE 2

Prolonged adsorption experiment with acetone-butyl alcohol solution.

Speed of input: 100 cc. per 1 hour. Activated charcoal: 97 g.
Aqueous feed:
  0.84% w./v. acetone
  1.66% w./v. butanol 2.50% w./v. total neutral solvents.

| Stages | Input | | | | Output | | | |
|---|---|---|---|---|---|---|---|---|
|  | Liquid, ccs. | Acetone, g. | Butanol, g. | Total solvents, g. | Liquid, ccs. | Acetone, g. | Butanol, g. | Total solvents, g. |
| 1 | 200 | 1.68 | 3.32 | 5.0 | 150 | | | |
| 2 | 200 | 1.68 | 3.32 | 5.0 | 177 | | | |
| 3 | 200 | 1.68 | 3.32 | 5.0 | 200 | | | |
| 4 | 200 | 1.68 | 3.32 | 5.0 | 195 | 1.89 | 0.13 | 2.02 |
| 5 | 200 | 1.68 | 3.32 | 5.0 | 205 | 2.53 | 0.20 | 2.73 |
| 6 | 200 | 1.68 | 3.32 | 5.0 | 195 | 1.70 | 2.15 | 3.85 |
| 7 | 200 | 1.68 | 3.32 | 5.0 | 205 | 1.74 | 3.32 | 5.06 |
| 8 | 200 | 1.68 | 3.32 | 5.0 | 195 | 1.57 | 3.14 | 4.71 |
| 9 | 200 | 1.68 | 3.32 | 5.0 | 202 | 1.93 | 3.55 | 5.48 |
| 10 | 200 | 1.68 | 3.32 | 5.0 | 200 | 1.55 | 3.39 | 4.94 |
| 11 | 200 | 1.68 | 3.32 | 5.0 | 202 | 1.55 | 4.06 | 5.61 |

The first three stages of the operation indicate general and total adsorption of the solvents, that is, in quantitative values 15 g. of neutral solvents for 97 g. charcoal. In the next stages a selectivity of the adsorption becomes apparent.

It will be observed from the above table that at the end of stage 3, the activated charcoal has absorbed all of the butyl alcohol and all of the acetone in the liquid fed in these three stages, i. e. 9.96 grams of butyl alcohol and 5.04 grams of acetone (a ratio of about 2:1 which was the same ratio in which these were present in the original solution).

During the next three stages, butyl alcohol is adsorbed from the solution, by the activated charcoal, displacing some of the acetone already adsorbed. In other words, during stages 3, 4 and 5, a part of the acetone previously adsorbed was liberated into the solution. The activated charcoal at the end of stage 6 will be seen to hold, adsorbed from the solution $$6 \times 3.32 - (0.13 + 0.20 + 2.15) = 17.44 \text{ grams}$$

of butyl alcohol. It also contains, adsorbed, $6 \times 1.68 - (1.89 + 2.53 + 1.70) = 3.96$ grams of acetone. Here the ratio of butyl alcohol to acetone is about 4.4:1. In other words the butyl alcohol to acetone ratio, adsorbed in the activated charcoal, has more than doubled, in stages 4, 5 and 6, and this ratio can be further increased (slightly) during stages 7, 8, 9 and 10.

The figures in the above table thus illustrate the selectivity of the adsorption of butyl alcohol over adsorption of acetone.

EXAMPLE 3

For the sake of comparison and in order to explain the results obtained, separate experiments with aqueous acetone and butyl alcohol solutions were carried out.

Speed of input: 100 cc. per 1 hour. Activated charcoal: 100 g.
Aqueous feed: 0.84% w./v. acetone.

| Stages | Input | | Output | | Adsorption Acetone, g. |
|---|---|---|---|---|---|
|  | Liquid, cc. | Acetone, g. | Liquid, cc. | Acetone, g. | |
| 1 | 200 | 1.68 | 150 | | 1.68 |
| 2 | 200 | 1.68 | 172 | | 1.68 |
| 3 | 200 | 1.68 | 195 | | 1.68 |
| 4 | 200 | 1.68 | 185 | 0.07 | 1.61 |
| 5 | 200 | 1.68 | 215 | 0.8 | 0.88 |
| 6 | 200 | 1.68 | 192 | 1.5 | 0.18 |
| 7 | 200 | 1.68 | 197 | 1.6 | 0.08 |
| 8 | 200 | 1.68 | 200 | 1.6 | 0.08 |
| 9 | 200 | 1.68 | 197 | 1.6 | 0.08 |
| 10 | 200 | 1.68 | 212 | 1.6 | 0.08 |

Results: 100 g. activated charcoal adsorbed about 7.5 g. acetone from the first 1000 cc. of the dilute solution, then equilibrium was reached.

No substantial elution of the acetone adsorbed took place in the further stages.

Speed of input: 100 cc. per hour. Activated charcoal: 95 g.
Aqueous feed: 1.66% w./v. butanol.

| Stages | Input | | Output | | Adsorption Butanol, g. |
|---|---|---|---|---|---|
|  | Liquid, cc. | Butanol, g. | Liquid, cc. | Butanol, g. | |
| 1 | 200 | 3.32 | 160 | | 3.32 |
| 2 | 200 | 3.32 | 170 | | 3.32 |
| 3 | 200 | 3.32 | 200 | | 3.32 |
| 4 | 200 | 3.32 | 200 | | 3.32 |
| 5 | 200 | 3.32 | 200 | | 3.32 |
| 6 | 200 | 3.32 | 200 | 1.6 | 1.72 |
| 7 | 200 | 3.32 | 208 | 3.2 | 0.12 |
| 8 | 200 | 3.32 | 200 | 3.2 | 0.12 |
| 9 | 200 | 3.32 | 200 | 3.2 | 0.12 |

Result: 95 g. activated charcoal adsorbed about 18.3 g. butanol from the first 1200 cc. of the dilute solution, then equilibrium was reached.

EXAMPLE 4

The following tables show that the contact time has no marked effect on the result. On industrial scale, indeed, the possible speed of throughput will be governed by the specific equipment and arrangement used.

In order to appreciate the meaning of the following tables it has to be borne in mind that the corresponding experiment in Example 2 had a speed of input of 100 cc. per hour on approximately the same amount of charcoal.

Speed of input: 200 cc. per hour. Activated charcoal: 100 g.
Aqueous feed:
0.84% w./v. acetone
1.66% w./v. butanol
―――
2.50% w./v. total neutral solvents.

| Stages | Input | | | | Output | | | Adsorption | | |
|---|---|---|---|---|---|---|---|---|---|---|
| | Liquid, cc. | Acetone, g. | Butanol, g. | Total solvents, g. | Acetone, g. | Butanol, g. | Total solvents, g. | Acetone, g. | Butanol, g. | Total solvents, g. |
| 1 | 200 | 1.68 | 3.32 | 5.0 | | | | 1.68 | 3.32 | 5.0 |
| 2 | 200 | 1.68 | 3.32 | 5.0 | | | | 1.68 | 3.32 | 5.0 |
| 3 | 200 | 1.68 | 3.32 | 5.0 | | | | 1.68 | 3.32 | 5.0 |
| Total | 600 | 5.04 | 9.96 | 15.0 | | | | 5.04 | 9.96 | 15.0 |
| 4 | 200 | 1.68 | 3.32 | 5.0 | 2.7 | | 2.7 | | 3.32 | 2.3 |
| 5 | 200 | 1.68 | 3.32 | 5.0 | 2.9 | | 2.9 | | 3.32 | 2.1 |
| Total | 1,000 | 8.4 | 16.6 | 25.0 | 5.6 | | 5.6 | 2.8 | 16.6 | 19.4 |
| 6 | 200 | 1.68 | 3.32 | 5.0 | 2.2 | 2.2 | 4.4 | | 1.1 | 0.6 |
| 7 | 200 | 1.68 | 3.32 | 5.0 | 1.9 | 2.6 | 4.5 | | 0.7 | 0.5 |
| 8 | 200 | 1.68 | 3.32 | 5.0 | 1.6 | 3.2 | 4.8 | | 0.1 | 0.2 |
| 9 | 200 | 1.68 | 3.32 | 5.0 | 1.6 | 3.3 | 4.9 | | | |
| 10 | 200 | 1.68 | 3.32 | 5.0 | 1.5 | 3.4 | 4.9 | | | |
| 11 | 200 | 1.68 | 3.32 | 5.0 | 1.5 | 3.3 | 4.8 | | | |

Result: The increased rate of feed did not alter the general trend of the process.

After the first three stages (600 cc. aqueous feed) the total adsorption reached its limit of 15 g. of neutral solvents. The output was entirely free of solvents.

In the next two stages (altogether 1000 cc. aqueous feed) butanol was selectively further adsorbed, reaching a limit of 16.6 g. At the same time the acetone was mainly eluted or replaced by butanol so that the treated solution (output) contained 5.6 g. pure acetone and no butanol. At this separation stage the adsorption amounted to 16.6 g. butanol and 2.8 g. acetone which can be easily removed from the charcoal whilst the output solution can be freed from its content of pure acetone by adsorption in a separate column.

The continuation of the process (stages 6 to 11 shows at the beginning a slight further partial adsorption of butanol at the expense of acetone and leads then to a constant equilibrium between input and output.

When after stage 11 pure water was run through the column (200 cc. per hour), both the adsorbed butanol and acetone were partly washed out but approximately in the same proportion as contained on the charcoal.

Speed of input: 300 cc. per 1 hour. Activated charcoal: 97 g.
Aqueous feed as in the preceding table.

| Stages | Input | | | | Output | | | Adsorption | | |
|---|---|---|---|---|---|---|---|---|---|---|
| | Liquid, cc. | Acetone, g. | Butanol, g. | Total solvents, g. | Acetone, g. | Butanol, g. | Total solvents, g. | Acetone, g. | Butanol, g. | Total solvents, g. |
| 1 | 200 | 1.68 | 3.32 | 5.0 | | | | 1.68 | 3.32 | 5.0 |
| 2 | 200 | 1.68 | 3.32 | 5.0 | | | | 1.68 | 3.32 | 5.0 |
| 3 | 200 | 1.68 | 3.32 | 5.0 | | | | 1.68 | 3.32 | 5.0 |
| 4 | 200 | 1.68 | 3.32 | 5.0 | 2.14 | | 2.14 | | 3.32 | 2.8 |
| 5 | 200 | 1.68 | 3.32 | 5.0 | 2.5 | 0.6 | 3.1 | | 2.72 | 1.9 |
| 6 | 200 | 1.68 | 3.32 | 5.0 | 2.7 | 1.8 | 4.5 | | 1.52 | 0.5 |
| 7 | 200 | 1.68 | 3.32 | 5.0 | 2.3 | 2.6 | 4.9 | | 0.72 | 0.1 |
| 8 | 200 | 1.68 | 3.32 | 5.0 | 1.7 | 3.5 | 5.2 | | | |

EXAMPLE 5

INFLUENCE OF CONCENTRATION

The description of the following run shows that the general appearance of the procedure is not altered if much more dilute solutions are the starting material. Here the highest previously proven rate of throughput was used.

Speed of input: 300 cc. per hour. Activated charcoal: 110 g.
Aqueous feed: 0.42% w./v. acetone
0.83% w./v. acetone
―――
1.25% w./v. total neutral solvents.

| Stages | Input | | | | Output | | | Adsorption | | |
|---|---|---|---|---|---|---|---|---|---|---|
| | Liquid, cc. | Acetone, g. | Butanol, g. | Total solvents, g. | Acetone, g. | Butanol, g. | Total solvents, g. | Acetone, g. | Butanol, g. | Total solvents, g. |
| 1 | 200 | 0.84 | 1.66 | 2.5 | | | | 0.84 | 1.66 | 2.5 |
| 2 | 200 | 0.84 | 1.66 | 2.5 | | | | 0.84 | 1.66 | 2.5 |
| 3 | 200 | 0.84 | 1.66 | 2.5 | | | | 0.84 | 1.66 | 2.5 |
| 4 | 200 | 0.84 | 1.66 | 2.5 | | | | 0.84 | 1.66 | 2.5 |
| 5 | 200 | 0.84 | 1.66 | 2.5 | 0.1 | | 0.1 | 0.74 | 1.66 | 2.4 |
| 6 | 200 | 0.84 | 1.66 | 2.5 | 0.3 | | 0.3 | 0.54 | 1.66 | 2.2 |
| 7 | 200 | 0.84 | 1.66 | 2.5 | 1.3 | | 1.3 | | 1.66 | 1.2 |
| 8 | 200 | 0.84 | 1.66 | 2.5 | 1.6 | | 1.6 | | 1.66 | 0.9 |
| 9 | 200 | 0.84 | 1.66 | 2.5 | 1.5 | 0.3 | 1.8 | | 1.36 | 0.7 |
| 10 | 200 | 0.84 | 1.66 | 2.5 | 1.4 | 0.6 | 2.0 | | 1.06 | 0.5 |
| 11 | 200 | 0.84 | 1.66 | 2.5 | 1.3 | 0.7 | 2.0 | | 0.96 | 0.5 |
| 12 | 200 | 0.84 | 1.66 | 2.5 | 1.3 | 0.7 | 2.0 | | 0.96 | 0.5 |
| Total | 2,400 | 10.08 | 19.92 | 30.0 | | | | 4.64 | 17.62 | 18.9 |

After the first five stages the total adsorption of neutral solvents reached its limit, the output being substantially free of solvents. In the next three stages elution of acetone and simultaneous replacement by butanol was effected, the output containing only acetone.

The same result was obtained with much more concentrated solutions.

Speed of input: 300 cc. per hour. Activated charcoal: 100 g.
Aqueous feed: 3.32% w./v. acetone
6.68% w./v. butanol
———
10.0% total neutral solvents.

| Stages | Input | | | | Output | | | Adsorption | | |
|---|---|---|---|---|---|---|---|---|---|---|
| | Liquid, cc. | Acetone, g. | Butanol, g. | Total solvents, g. | Acetone, g. | Butanol, g. | Total solvents, g. | Acetone, g. | Butanol, g. | Total solvents, g. |
| 1 | 200 | 6.64 | 13.36 | 20 | 0.67 | | 0.67 | 5.97 | 13.36 | 19.33 |
| 2 | 100 | 3.32 | 6.68 | 10 | 4.42 | 1.91 | 6.33 | | 4.77 | 3.67 |
| 3 | 100 | 3.32 | 6.68 | 10 | 4.84 | 4.2 | 9.04 | | 2.48 | 0.96 |
| Total | 400 | 13.28 | 26.72 | 40 | 9.93 | 6.11 | 16.04 | 3.35 | 20.61 | 23.96 |

It is worth mentioning that all the figures recorded refer to a specific brand of activated charcoal which was the same in all experiments recorded here. Obviously the quality of the charcoal can vary and, as a matter of fact, I have had brands of charcoal with considerably higher adsorbent capacity but the general behaviour, especially with regard to the selectivity of adsorption was not changed.

EXAMPLE 6

RECOVERY OF ADSORBED SOLVENTS

In order to release the adsorbed solvent mixture or pure solvent, the adsorption bed has to be regenerated, usually by circulating hot air or steam at atmospheric pressure through the layers of activated charcoal. In the commonly known case the vapour adsorption, the efficiency of adsorption is dependent upon two factors, one the so-called retentivity or specific adsorptive capacity, and the other the capillary adsorption action, the sum of these two being the total adsorption capacity or saturation value. The adsorbed vapours can be readily recovered from the carbon by heating at 100 to 150° at which point the adsorptive power is sufficiently decreased to allow the easy removal of the vapours. When steam is used for the regeneration of a carbon bed, the moisture remaining in the carbon is immediately evaporated owing to the selective displacement by solvent vapour when adsorption is resumed. Thus, for instance, in the "Acticarbone process" for the removal of entrained alcohol vapours in concentrations of 0.75 to 1% the saturated absorber is steamed and the distillate is condensed as a solution of 10 to 12% alcohol.

Although both methods of recovery mentioned are applicable in my case, the theoretical situation is somewhat different here due to the fact that adsorption is taking place not from vapour phases but from very dilute aqueous solution.

It has been found that during the first stage of the adsorption a part of water is retained by the adsorbent and remains there till saturation is reached. Thus the input of the first 400 cc. aqueous feed yielded usually only 320 to 330 cc. liquid in the output, 100 g. activated charcoal being used. In the further stage or stages of adsorption the liquid output substantially equalled the input. The water thus retained in the column (of the order of 70 to 80 cc. in my examples) dilutes naturally the concentration of the adsorbed solvents.

This position will be made clear by some typical experimental data.

(1) 100 g. activated charcoal, fed with a 10% aqueous solution, adsorbed 3.35 g. acetone and 20.61 g. butanol, in total 23.96 g., and retained at this stage 73 cc. of water.

Whilst the initial strength of the feed was 3.32% of acetone and 6.68% of butanol, that is, in total 10%, the concentration in the column had been increased to 4.6% of acetone and 28.2% of butanol, together 32.8%.

(2) 100 g. activated charcoal, fed with a 2.5% aqueous solution, adsorbed 4.7 g. acetone and 23.3 g. butanol and retained at this stage 70 cc. of water.

Whilst the initial percentage of the feed was 0.84% acetone and 1.66% butanol, together 2.5%, the concentration in the column had been increased to 6.7% of acetone and 33.3% of butanol, together 40.0%.

In order to avoid further dilution of the adsorbed solutions, treatment of the saturated charcoal with steam is replaced by the circulation of hot gases, preferably inert gases, through the adsorption bed.

This operation was experimentally carried out by the application of outside heating, namely by passing steam through the well insulated column jackets so that the temperature of the adsorption bed was raised up to 100° C., and by simultaneous suction at the end of the open recovery system. The efficiency of the solvent elimination was increased, especially towards the end of the procedure by application of a moderate vacuum. It is obvious that a well cooled condensation system must be provided.

A typical result was this:

100 g. activated charcoal held adsorbed 2.2 g. acetone and 20.2 g. butanol in 75 cc. retained water. The regeneration of the wet charcoal bed by means of hot air and slight vacuum yielded 2.17 g. acetone and 17.8 g. butanol in 75 cc. total liquid.

The application of a slightly higher outside temperature will still increase the yield of recovered butanol.

The active carbon bed was in the end completely dry and ready for adsorption to be resumed.

Over a number of runs, followed by regeneration of the charcoal, the adsorption power was measured. The following figures show that no change takes place within the limits of errors. It has also been observed that no disintegration of the adsorbent mass took place.

Speed of input: 300 cc. per hour. Activated charcoal: 100 g.
Feed: 0.84% w./v. acetone
1.66% w./v. butanol
———
2.50% w./v. neutral solvents.

| | Input, cc. | Adsorption | | Output | |
|---|---|---|---|---|---|
| | | acetone, g. | butanol, g. | acetone, g. | butanol, g. |
| Adsorption No. 1 Regeneration | 1,000 | 3.8 | 16.6 | 4.6 | ------- |
| Adsorption No. 2 Regeneration | 1,000 | 3.2 | 16.6 | 5.2 | ------- |
| Adsorption No. 3 Regeneration | 1,000 | 2.8 | 16.3 | 5.6 | 0.3 |
| Adsorption No. 4 | 1,000 | 3.4 | 16.0 | 5.0 | 0.6 |

EXAMPLE 7

ADSORPTION OF 2,3-BUTYLENE GLYCOL

The quantitative determination of 2.3-butylene glycol consisting in its oxidation with periodic acid to acetaldehyde which for its part is titrated as oxime, was carried out according to the method by M. C. Brockmann and C. H. Workman in Ind. and Eng. Chem., Anal. Ed., 1933, 206. This estimation, giving satisfactory results with standardised solutions of the glycol, is not affected by the presence of ethyl alcohol.

THE ADSORBTION ON ACTIVATED CHARCOAL

In each of the following typical examples, the temperature of adsorption was kept constant at about 14°. The speed of input was always 140 cc. per hour. The brand of charcoal employed was coarsely granulated active carbon 100 g. of which occupied a volume of 280 cc.

*Experiment I*

Aqueous feed: 3.3% w./v. butylene glycol. Active carbon: 100 g.

| Input | | Output | | Adsorption |
|---|---|---|---|---|
| Liquid, cc. | Glycol, g. | Liquid, cc. | Glycol, g. | Glycol, g. |
| 1,100 | 36.3 | 1,024 | 8.5 | 27.8 |
| 500 | 16.5 | 500 | 9.5 | 7.0 |
| 500 | 16.5 | 500 | 10.2 | 6.3 |
| | 69.3 | | 28.2 | 41.1 |

*Experiment II*

Aqueous feed: 2.734% w./v. butylene glycol. Active carbon: 100 g.

| Input | | Output | | Adsorption |
|---|---|---|---|---|
| Liquid, cc. | Glycol, g. | Liquid, cc. | Glycol, g. | Glycol, g. |
| 1,000 | 27.34 | 905 | 6.94 | 20.4 |
| 500 | 13.67 | 500 | 6.72 | 6.95 |
| 500 | 13.67 | 500 | 11.27 | 2.4 |
| | 54.68 | | 24.93 | 29.75 |

In these two experiments, 59.3% and 54.4%, respectively, of the glycol input have been adsorbed.

Recovery of the adsorbed butylene glycol is possible by the usual methods. Care must be taken to exclude oxygen in the desorption at elevated temperature as otherwise with the traces of heavy metals always present in the charcoal dehydrogenation to acetyl-methyl-carbinol and even to diacetyl takes place.

GENERAL

The contact of the fermented mash, after removal of the insoluble components, with the adsorbent can be effected in any technically suitable manner, for example by passing the liquor through layers of the adsorbent material. The adsorbents have to be chosen according to their selective extraction capacity and although active carbon proved to be very effective, other materials, commonly used as adsorbents may be employed.

The temperature of the adsorption operation should be controlled since adsorption is generally more effective at lower temperatures.

Other technical means of recovery of the fermentation products from the adsorbent may be used, application of heat, subatmospheric pressure, and steam being particularly suitable. Another possibility is the extraction of the adsorbate with a suitable solvent, suitable both in the sense that its affinity for the adsorbed products is greater than the affinity of charcoal for them and in the sense that the solvent has a boiling point sufficiently different from the adsorbed chemicals and does not form constant-boiling mixtures with them. The reactivation of the adsorbent depends on its particular properties, for example, activated charcoal is easily reactivated with steam. The final mash may be filtered or acidified before adsorption, or one or more of its constituents may be removed before adsorption, for instance, by distillation.

The invention is not limited to the recovery of fermentation products of the acetone-butanol fermentation. Since the problem of separation of the metabolism products from dilute liquors applies also to other fermentation processes, the separation of fermentation products by adsorption may be employed, for example, in fermentations producing ethyl-alcohol, glycerol and butylene glycol.

I claim:

1. A process of obtaining butyl alcohol and acetone from a fermented liquid mash containing said two substances which comprises substantially completely removing undissolved solid residue of the fermentation process from said liquid mash, contacting the substantially clear liquid portion of said mash with activated carbon, until such carbon contains a relatively great amount of adsorbed butyl alcohol with only a much less amount of acetone, and similarly contacting the remaining liquid portion of said mash from which butyl alcohol has been so adsorbed on activated charcoal with a separate quantity of activated charcoal until said liquid no longer contains acetone, whereby said second quantity of activated charcoal adsorbs the acetone from said liquid.

2. A process of obtaining butyl alcohol and acetone from a fermented liquid mash containing said two substances which comprises substantially completely removing undissolved solid residue of the fermentation process from said liquid mash, contacting the substantially clear liquid portion of the mash with activated carbon, until such carbon contains a relatively great amount of adsorbed butyl alcohol with only a much smaller amount of acetone, and similarly contacting the remaining liquid from which butyl alcohol has been so adsorbed on activated charcoal with a separate quantity of activated charcoal until said liquid no longer contains acetone, whereby said second quantity of activated charcoal adsorbs the acetone from said liquid, and separately distilling the adsorbed solvents from said two batches of said activated charcoal.

3. A process of recovering acetone and butyl alcohol from a fermented liquid mash containing same, which comprises (a) first removing substantially all solid undissolved material from said mash, (b) flowing successive amounts of said mash through a body of activated charcoal acting as a solid adsorbent material, until the outflowing mash is substantially free from both acetone and butyl alcohol, then (c) continuing the flowing of more of said mash in contact with such treated solid adsorbent material until the amount of butyl alcohol held by said adsorbent material has substantially increased and until the amount of acetone held by said adsorbent material has substantially decreased, (d) separating said solid adsorbent material so charged with much butyl alcohol and with a little acetone, and said treated mash from each other, and (e) flowing the treated mash from said step (c) in contact with a separate body of said solid adsorbent material to adsorb substantially all the acetone from said treated mash, and separately recovering the adsorbed solvents from the said two bodies of solid adsorbent material, by separate distillations.

4. A process of treating a liquid fermented mash which is substantially devoid of undissolved solids and which contains fermentation products including acetone and butyl alcohol, which comprises (1) flowing such liquid mash through a batch of activated charcoal so long as the liquid output is substantially free of both acetone and butyl alcohol, whereby the activated charcoal adsorbs acetone and butyl alcohol in substantially the same ratio as these exist in said fermented mash, (2) continuing the process by flowing an additional quantity of said fermented mash through the same batch of activated charcoal while collecting the liquid output of such step separately from the liquid output of said first step, and continuing this second step until the ratio of adsorbed butyl alcohol to adsorbed acetone in said batch of activated charcoal has increased substantially above the ratio of butyl alcohol to acetone adsorbed in said activated charcoal at the end of said first step, (3) distilling said adsorbed acetone and butyl alcohol from said activated charcoal, whereby the latter is rendered again suitable for use in said operations.

5. A process of treating a liquid fermented mash which is substantially devoid of undissolved solids and which contains fermentation products including acetone and butyl alcohol, which comprises (1) flowing such liquid mash through a batch of activated charcoal so long as the liquid output is substantially free of both acetone and butyl alcohol, whereby the activated charcoal adsorbs acetone and butyl alcohol in substantially the same ratio as these exist in said fermented mash, (2) continuing the process by flowing an additional quantity of said fermented mash through the same batch of activated charcoal while collecting the liquid output of such step separately from the liquid output of said first step, and continuing this second step until the ratio of adsorbed butyl alcohol to adsorbed acetone in said batch of activated charcoal has increased substantially above the ratio of butyl alcohol to acetone adsorbed in said activated charcoal at the end of said first step, and distilling said adsorbed acetone and butyl alcohol from said activated charcoal, whereby the latter is rendered again suitable for use in said operations, and separately treating the liquid output of such second step with a batch of activated charcoal different from that left from such first two steps.

6. A process of treating a liquid fermented mash which is substantially devoid of undissolved solids and which contains fermentation products including acetone and butyl alcohol, which comprises (1) flowing such liquid mash through a batch of activated charcoal so long as the liquid output is substantially free of both acetone and butyl alcohol, whereby the activated charcoal adsorbs acetone and butyl alcohol in substantially the same ratio as these exist in said fermented mash, (2) continuing the process by flowing an additional quantity of said fermented mash through the same batch of activated charcoal while collecting the liquid output of such step separately from the liquid output of said first step, and continuing this second step until the ratio of adsorbed butyl alcohol to adsorbed acetone in said batch of activated charcoal has increased substantially above the ratio of butyl alcohol to acetone adsorbed in said activated charcoal at the end of said first step, and (3) distilling said adsorbed acetone and butyl alcohol from said activated charcoal, whereby the latter is rendered again suitable for use in said operations, (4) flowing the liquid output of such second step through a batch of activated charcoal which is separate from that used in said first step, until said second mentioned activated charcoal has adsorbed a substantial amount of acetone, and (5) distilling said acetone from said second mentioned activated charcoal while separate from the above mentioned distillation step.

MAX SULZBACHER.

REFERENCES CITED

The following references are of record in the file of this patent:

UNITED STATES PATENTS

| Number | Name | Date |
|---|---|---|
| 823,366 | Roehr | June 12, 1906 |
| 1,453,215 | Voress et al. | Apr. 24, 1923 |
| 1,528,905 | Woodruff | Mar. 10, 1925 |
| 1,616,073 | Arentz | Feb. 1, 1927 |
| 1,898,688 | Rose | Feb. 21, 1933 |
| 2,062,075 | Wallerstein | Nov. 24, 1936 |
| 2,114,331 | Brown | Apr. 19, 1938 |
| 2,120,227 | Brant | June 14, 1938 |
| 2,141,798 | Peterson | Dec. 27, 1938 |
| 2,254,745 | Jannek | Sept. 2, 1941 |
| 2,261,926 | Nolte et al. | Nov. 4, 1941 |
| 2,339,386 | Edwards | Jan. 18, 1944 |

OTHER REFERENCES

Deitz: "Bibliography of Solid Adsorbents," pages 203, 226, 630, 631; published 1944.

Simonin: "Chemical Abstracts," vol. 25, page 2248 (1931).